Patented Aug. 9, 1932                                       1,870,402

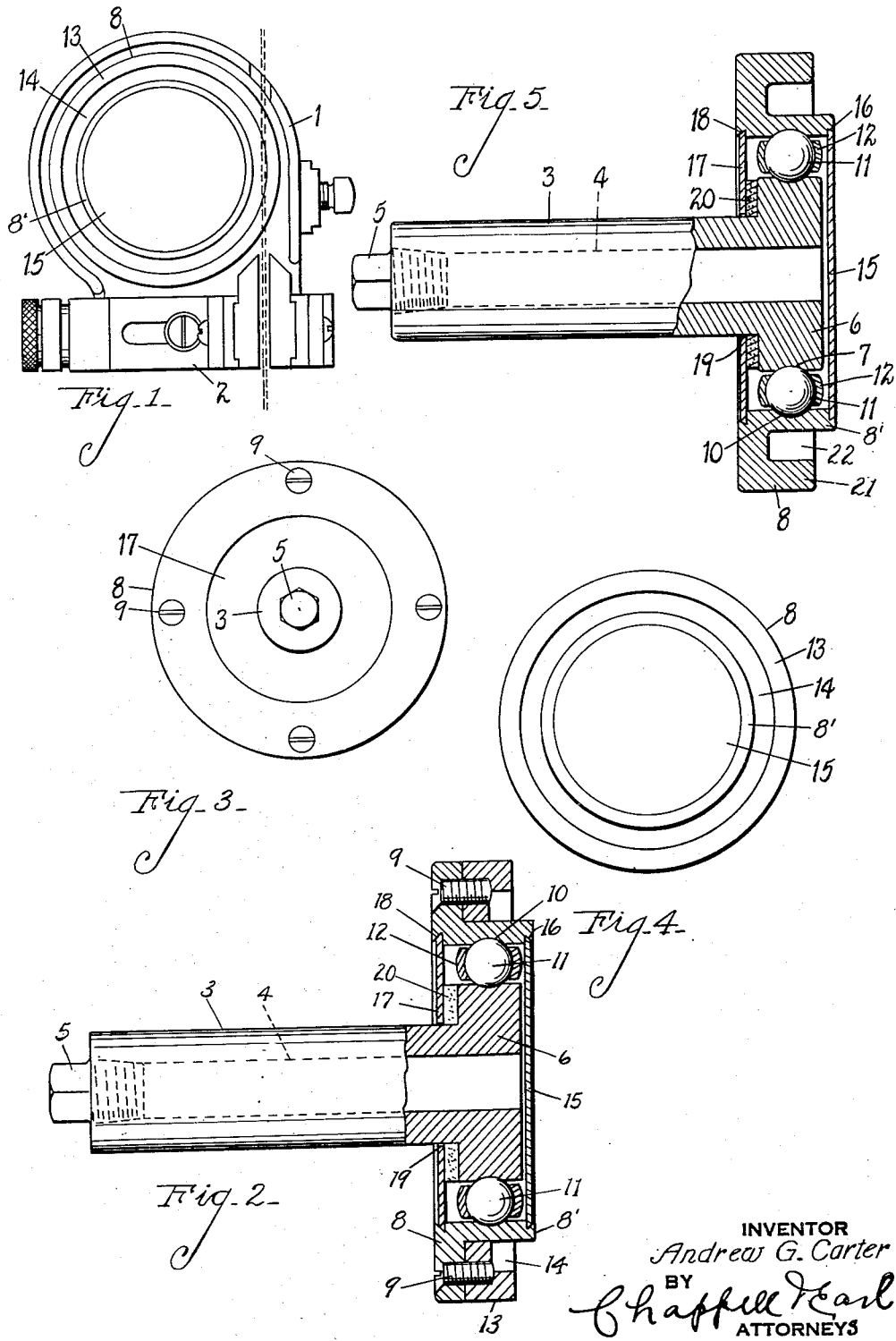

UNITED STATES PATENT OFFICE

ANDREW G. CARTER, OF GRAND RAPIDS, MICHIGAN

BAND-SAW GUIDE WHEEL

Application filed April 16, 1931. Serial No. 530,539.

The main objects of this invention are:

First, to provide a band saw guide wheel which permits the forming of the wheel proper of material well adapted to withstand the wear.

Second, to provide a band saw guide wheel in which the bearing parts are thoroughly protected and adapted to retain lubricant for a long period of time.

Third, to provide a band saw guide wheel in which the face is presented to the saw so that there is a minimum of wear on the saw, and wear on the band saw wheel is uniformly distributed.

Objects pertaining to details and economies of my invention will appear from the description to follow. The invention is defined and pointed out in the claims.

A structure which is a preferred embodiment of my invention is illustrated in the accompanying drawing, in which:

Fig. 1 is a front elevation of my band saw guide wheel, the saw being shown in operative relation thereto by dotted lines.

Fig. 2 is a fragmentary section of my band saw guide wheel, parts being shown in full lines.

Fig. 3 is an end view looking from the left of Fig. 2.

Fig. 4 is a face or front elevation of the wheel.

Fig. 5 is a fragmentary section corresponding to that of Fig. 2 of a slightly modified form or embodiment of my invention.

Referring to the drawing, the supporting bracket 1 and the guide jaw assembly indicated at 2 are preferably that of my application for Letters Patent on the band saw guide filed concurrently herewith.

The support 1 is adapted to receive the spindle 3 which has a longitudinal bore 4 therein closed by the plug 5 at its inner end, this longitudinal bore constituting a lubricant passage and storage chamber.

At the outer end of the spindle and preferably integral therewith as illustrated, I provide an inner ball bearing member 6 having a ball race 7.

The guide wheel 8 is provided with an outer bearing member 8'. This outer bearing member has a ball race 10. The bearing balls 11 are provided with a cage shown at 12. I thus secure a combined radial and thrust bearing for the guide wheel.

The face 13 of the guide wheel is preferably formed as a separate part, that is, formed separately from the body of the wheel 8 and detachably secured thereto by screws 9 arranged through the wheel 8 from the rear side thereof. The wheel 8 has a forwardly facing shoulder to receive the annular face or wear element 13, which is of annular cross section, thereby providing an annular groove 14 in the face of the wheel. The face 13 of the wheel is separated from the outer bearing member 8' by an annular groove 14.

The outer bearing member is substantially wider than the inner bearing member so that it overhangs the inner bearing member at both sides and projects substantially beyond the face of the guide wheel.

The outer end of the outer bearing member is closed by the disk 15 which is secured in the shoulder or rabbet 16 formed in the outer end of the outer bearing member by upsetting or springing the disk into an undercut of the shoulder, thus completely closing the outer end of the bearing, the outer surface of the closure plate lying in the plane of the outer end of the bearing member.

The inner closure plate 17 is seated in a corresponding rabbet or shoulder 18 at the inner end of the outer bearing member, this plate having a central hole 19 to receive the spindle.

A packing 20 is arranged between the inner closure plate and the inner side of the inner bearing member thereby providing a sealed chamber for the bearing balls, preventing the entry of material from the outside which would be injurious to the bearing, and retaining the lubricant for a long period of time.

In the modification shown in Fig. 5 the wearing face 21 of the wheel is formed integrally with the body of the wheel, a groove 22 being formed in the front side of the wheel corresponding to the groove 14 of the embodiment having the removable face or wear member. The preferred embodiment shown has the advantage of permitting the ready removal of the part especially subjected to wear in use.

This arrangement of parts provides a guide wheel which requires very little attention in use, necessitating lubrication only at long intervals, is very durable both in the matter of its bearings and in the result of wear on the face of the wheel as it is presented to the saw so that wear is uniform and the wheel can be economically formed of materials well calculated to withstand the wear.

Having thus described my invention, what I claim as new and desire to secure by Letters Patent, is:

1. A band saw guide wheel comprising a spindle having a lubricating passage opening at its outer end and an integral inner bearing member at its outer end, a wheel having an integral outer bearing member overhanging the inner bearing member at both sides thereof, the outer bearing member projecting forwardly beyond the plane of the face of the wheel and being separated therefrom by an annular groove, bearing balls with cage coacting with said bearing members to provide radial and thrust bearing for said wheel, an outer closure plate fixed within the outer end of said outer bearing member, an inner closure plate fixed within the inner end of said outer bearing member and having a central spindle opening, and a packing arranged between the inner side of the said inner bearing member and said inner closure plate.

2. A band saw guide wheel comprising a spindle having a lubricating passage opening at its outer end and an integral inner bearing member at its outer end, a wheel having an integral outer bearing member overhanging the inner bearing member at both sides thereof, bearing balls with cage coacting with said bearing members to provide radial and thrust bearing for said wheel, an outer closure plate fixed within the outer end of said outer bearing member, an inner closure plate fixed within the inner end of said outer bearing member and having a central spindle opening, and a packing arranged between the inner side of the said inner bearing member and said inner closure plate.

3. A band saw guide wheel comprising a spindle having an inner bearing member at its outer end, a wheel having an outer bearing member overhanging the inner bearing member at both sides thereof, an outer closure plate fixed within the outer end of said outer bearing member, and an inner closure plate fixed within the inner end of said outer bearing member and having a central spindle opening provided with a packing.

4. A band saw guide wheel comprising a spindle having an inner bearing member at its outer end, a wheel rotatably mounted thereon and having an annular outwardly facing shoulder of substantial depth, and an annular face member detachably mounted on said shoulder, said face member being of annular cross section providing an annular groove at the inside of its face.

5. A band saw guide wheel comprising a spindle having an inner bearing member at its outer end, a wheel having an outer bearing member overhanging the inner bearing member at both sides thereof, an annular wear element for said wheel detachably secured thereto, an outer closure plate fixed within the outer end of said outer bearing member, and an inner closure plate fixed within the inner end of said outer bearing member and having a central spindle opening provided with a packing.

6. A band saw guide wheel comprising a spindle having an inner bearing member at its outer end, a wheel having an outer bearing member overhanging the inner bearing member at both sides thereof and enclosed on the outer side, and an inner closure plate fixed within the inner end of said outer bearing member and having a central spindle opening provided with a packing.

In witness whereof I have hereunto set my hand.

ANDREW G. CARTER.